STERLING BASS, M. D., OF SAVANNAH, GEORGIA.

Letters Patent No. 83,755, dated November 3, 1868.

IMPROVED MEDICAL COMPOUND.

The Schedule referred to in these Letters Patent and making part of the same.

*To all whom it may concern:*

Be it known that I, STERLING BASS, M.D., of Savannah, in the county of Chatham, and State of Georgia, have invented or discovered a new and useful Specific for Cure of Chills, of which the following is a full, clear, and exact description.

The specific for cure of chills which I here claim to have invented or discovered, and which is highly serviceable, both as a tonic and alterative, is composed of the following ingredients, or their equivalents, and in or about the proportions specified:

R. Purified chinoidine, one ounce.
Soluble citrate of iron, one ounce.
Extract of taraxicum, (dandelion,) one ounce.
Fluid extract of columbo, two ounces.
Alcohol, strong, one pint.

In mixing these several ingredients or medicines, the extract of taraxicum, (dandelion,) not being soluble in alcohol, must first be dissolved in a little water, using no more water than is necessary to dissolve, and the solution thus produced, added slowly to the mixture formed by the other ingredients or medicines, which should be agitated during the process of adding the taraxicum. The whole mixture being bottled, is then corked.

As a substitute for the soluble citrate of iron, ammoniated citrate of iron may be used, without changing the nature, or affecting the efficiency of the specific, but the soluble citrate is preferred.

The specific thus produced, cures chills, and fortifies the system against their recurrence.

The dose for adults, in case of ordinary chills, is a teaspoonful every hour, commencing three or four hours before the expected paroxysm. For children, of course the dose is reduced, varying with the age of the child, although, from the character of the specific, no danger is to be apprehended from an overdose. In obstinate and protracted chills, where the same occur at stated distant periods, as, for instance, every seven, fourteen, twenty-one, or twenty-eight days, the dose for an adult may be two teaspoonfuls of the specific, mixed with a little water, and be taken three times a day, commencing five or six days in advance of the period the chill is due or expected, and continued for several days, or up to said period, or longer, if necessary.

In using the specific as a tonic, the dose may be two teaspoonfuls, in a little brandy or water, three times a day.

What is here claimed, and desired to be secured by Letters Patent, is—

The specific for cure of chills, made up of the ingredients or medicines herein named, or their equivalents, in or about the proportions specified.

STERLING BASS, M. D.

Witnesses:
E. YULEE,
WM. D. HARDEN.